No. 770,387. PATENTED SEPT. 20, 1904.
W. RICHARDS.
FRUIT JAR.
APPLICATION FILED JUNE 2, 1904.
NO MODEL. 2 SHEETS—SHEET 2.
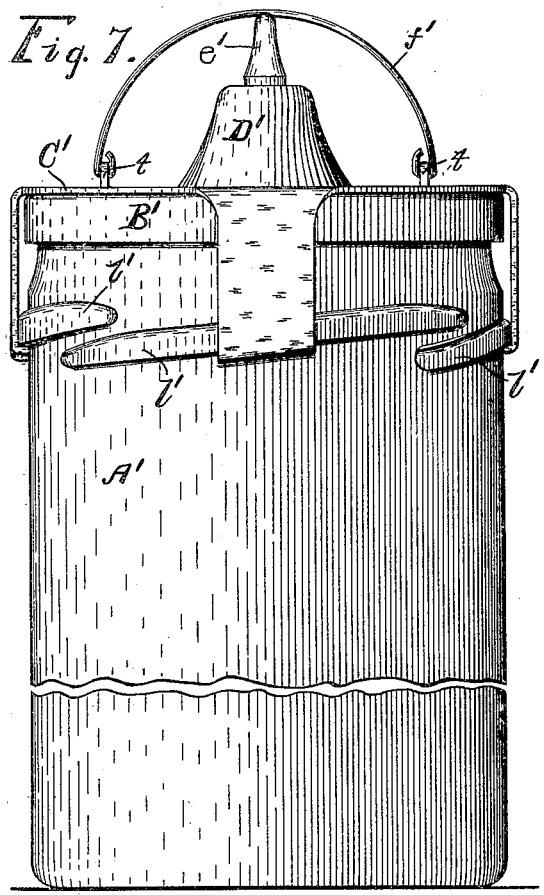
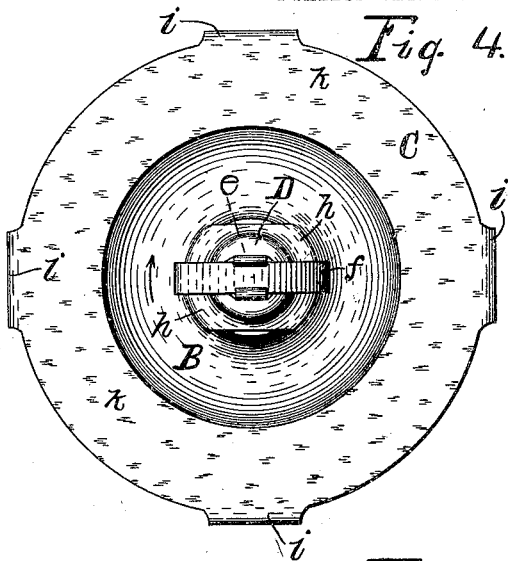
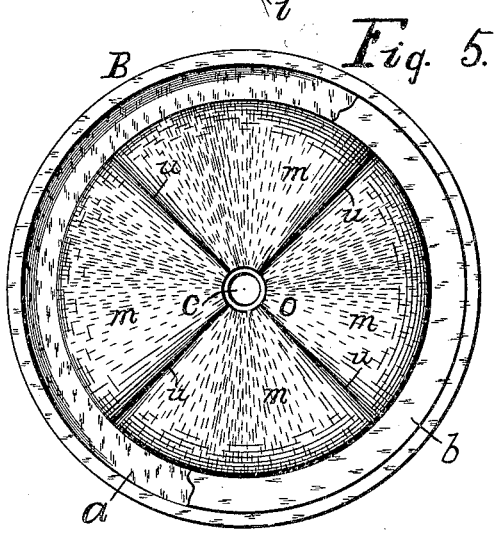
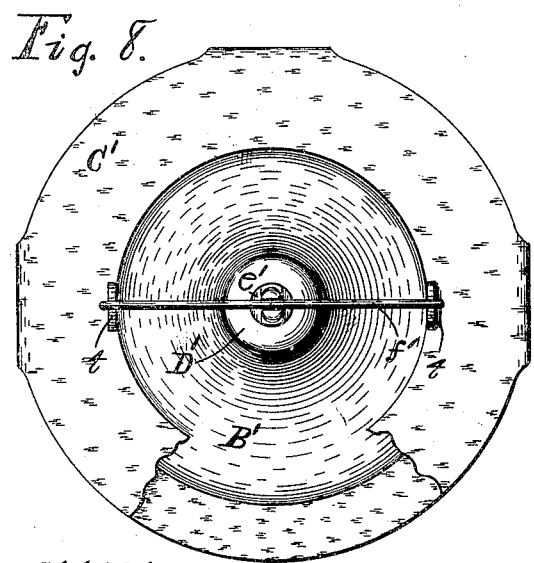
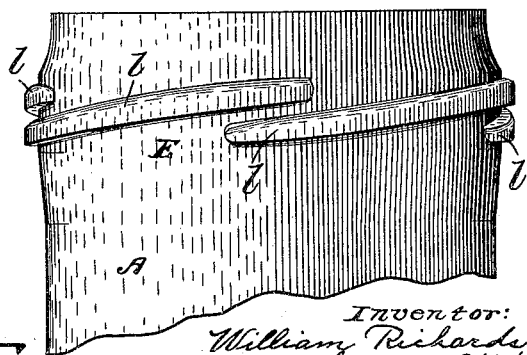
Inventor:
William Richards
By E. B. Whitmore, Atty.

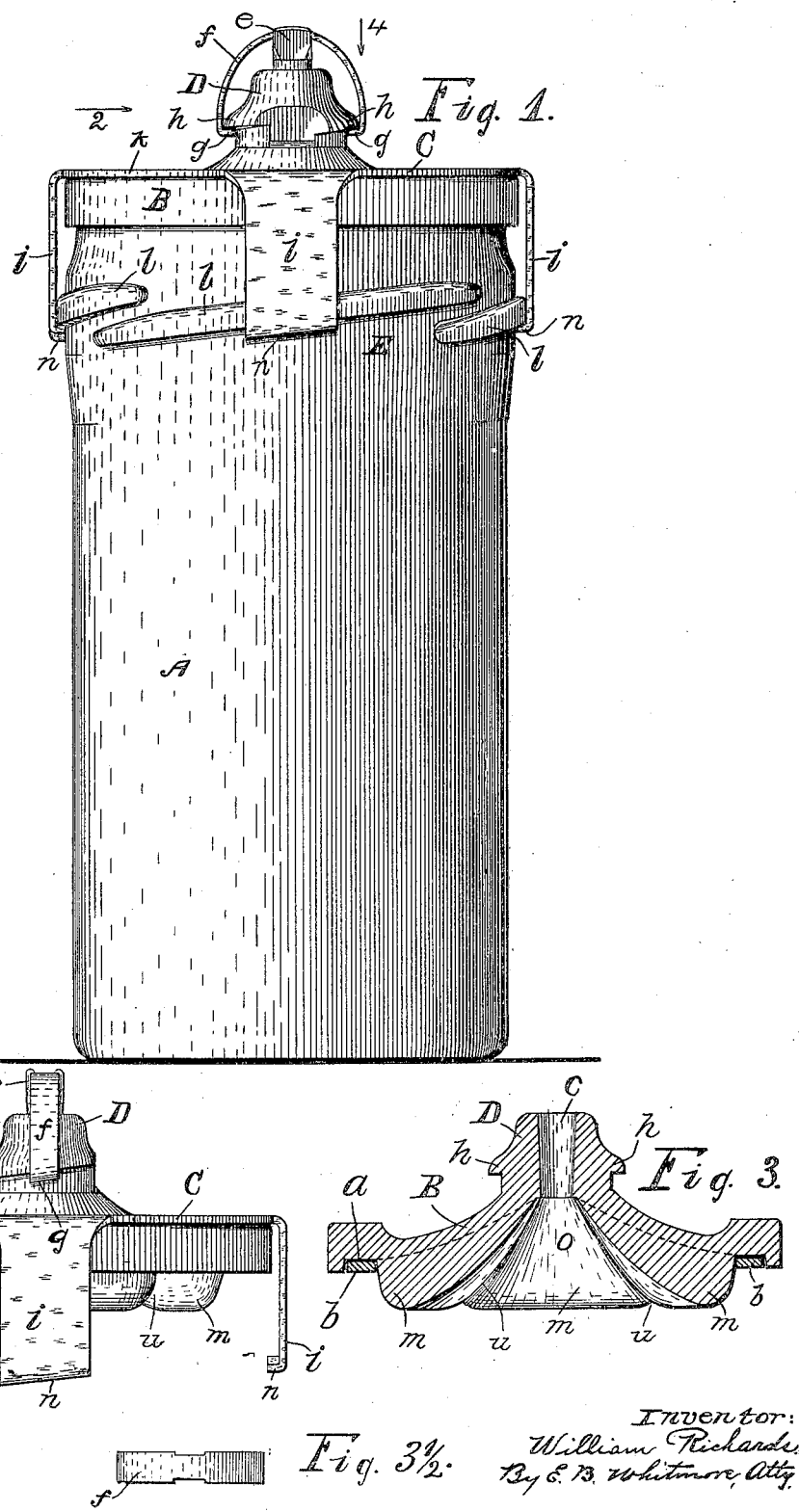

No. 770,387.　　　　　　　　　　　　　　　　　　Patented September 20, 1904.

UNITED STATES PATENT OFFICE.

WILLIAM RICHARDS, OF ROCHESTER, NEW YORK.

FRUIT-JAR.

SPECIFICATION forming part of Letters Patent No. 770,387, dated September 20, 1904.

Application filed June 2, 1904. Serial No. 210,894. (No model.)

*To all whom it may concern:*

Be it known that I, WILLIAM RICHARDS, of Rochester, in the county of Monroe and State of New York, have invented a new and useful Improvement in Fruit-Jars, which improvement is fully set forth in the following specification and shown in the accompanying drawings.

In using jars or cans as commonly constructed of glass or similar material for keeping fruit difficulty has been met with on account of the liability of the fruit to mold at the top and also on account of the difficulty frequently experienced in removing the covers when opening the jars, due to external atmospheric pressure. Difficulty has also been found in the tendency of the glass to crack or break at points where the holders for the covers take onto the sides of the bodies of the jars. Furthermore, the contracted tops or mouths of fruit-jars as heretofore commonly made have been found inconvenient in the matter of filling and emptying the jars and in the matter of cleansing the same after use. To remedy these and other difficulties experienced in the matter of successfully handling fuit-jars and keeping fruit and vegetables in them, I have produced the improved can or jar herein described and set forth, and shown in the accompanying drawings.

One object of my present invention is to so construct the parts of the jar that after the cover is secured to place upon the filled jar a preserving liquid may be added to fill the space above the fruit and exclude all remaining air from beneath the cover.

Another object of the invention is to so construct the parts that when opening the jar for removing the contents air may be primarily admitted within the jar to fill the vacuum and relieve the cover from external atmospheric pressure, thus permitting the convenient removal of the cover.

Further objects of my invention are to construct the jar with a broad mouth and of a diameter equal to that of the body of the jar for convenience in filling the jar and removing the contents and for cleaning the jar when emptied and also to form the body of the jar with a view to strengthen the same at the parts where the metal yoke or holder for the cover takes onto the sides of the jar.

Other objects and advantages of the invention will be brought out and made to appear in the following specification and more particularly pointed out in the appended claims, reference being had to the accompanying drawings, which, with the letters of reference marked thereon, form a part of this specification.

Figure 1 is a side elevation of my improved fruit-jar with all parts in place as when in use. Fig. 2 is a side elevation of upper parts of the jar detached, seen as indicated by arrow 2 in Fig. 1. Fig. 3 is a diametrical section of the cover, further showing its form on the inside. Fig. 3½ shows the binder for the stopper detached. Fig. 4 is a plan of the cover and associated parts seen as indicated by arrow 4 in Fig. 1. Fig. 5 is a plan of the inner surface of the cover. Fig. 6 is a side elevation of the upper part of the body of the jar drawn to more clearly show the overlapping ends of the spiral ribs. Figs. 7 and 8 are respectively a side elevation and a plan of parts of a jar, showing a simple modification in the method of holding the stopper.

The body A of the jar, Fig. 1, may be made of any desired size or of any suitable material, as glass, according to taste or convenience. The cover B is preferably made of glass or porcelain and held to place on the mouth of the jar by a circular clamp or holder C, of stiff elastic metal, as hard copper or galvanized iron. The cover B is larger in diameter than the adjacent part of the jar and is formed with an annular recess $a$, Figs. 3 and 5, for receiving a packing-ring $b$, of india-rubber or similar suitable material, for forming an air-tight joint between the cover and the opposing part of the jar. The cover is formed with an internal cavity $o$, Figs. 3 and 5, substantially conical and extended upward, forming a head D, Figs. 1 to 4, having at the top an axial tapered opening $c$ of circular cross-section communicating with the cavity $o$, as shown. The opening $c$ is adapted to receive a tapered stopper $e$, preferably of aluminium, held in position by a curved binder *f*. This binder bends over the upper end of the stopper, with downturned ends at the sides of the head D, and is formed with inturned parts *g g* at its lower terminals engaging under spiral inclined ledges *h h* of the head D below the stopper, so that by turning or swinging the binder around horizontally, as indicated by the arrow in Fig. 4, the stopper *e* will be drawn firmly down into the opening *c* to close the same.

The binder *f* may be connected with the head of the stopper by any convenient means; but I prefer to join the parts permanently, so as to act as a single part or piece. As shown, the head of the stopper is recessed to receive the binder, the latter being slightly reduced in width where engaging the stopper, as shown in Fig. 3½. The projecting parts of the stopper being bent over the sides of the binder serve to hold both parts permanently together, the stopper and the connected binder being attachable to or removable from the cover as a single rigid body.

The metallic holder C for the cover is commonly formed out of sheet metal, and it consists of an annular part or circular body *k*, with two or more pendent parts *i* overhanging the cover and extending downward at the sides of the body A of the jar, four being shown in the various figures. The body of the jar is formed with spiral inclined ribs or parts *l* projecting from its sides, under which inwardly-bent portions *n* of the parts *i* engage, as shown in Fig. 1. By turning the holder C toward the left as the parts appear in the figure it will be understood that the cover will be drawn downward and, with the intervening packing-ring *b*, will act to form an air-tight joint with the body of the jar. After the jar is filled at any time and the cover thus secured to place the small remaining airspace *o* over the fruit is filled through the opening *c* with some preserving liquid or with the remaining juice of the fruit. This capping of the fruit will exclude all the remaining air from the jar, and the stopper *d* being inserted in place and secured by means of the binder *f*, as stated, will complete the sealing of the jar.

In constructing these fruit-jars provision is made for preventing an overflowing of the liquid of the fruit when opening the jar for using the contents, which overflow would be liable to occur on account of the liquid contained in the space *o*, as specified. To prevent this overflowing of the jar, the cover is formed on its under side with a series of downwardly-projecting protuberances or lobes *m*, Figs. 2, 3, and 5, around the space *o* and within the circular packing-seat *a*. When the jar is filled with the fruit, the latter is not brought up even with the top of the jar, but left a short distance below the upper edge, and the cover being placed thereon the lobes *m* will sink into and displace parts of the liquid contents, causing the same to rise correspondingly in the space *o* of the cover, and when in eventually opening the jar the cover is removed the liquid in the space *o*, including that added in capping the jar, will descend and occupy the room or spaces previously occupied by the lobes *m*, and so will not overflow at the top of the jar.

The lobes *m* of the cover are separated by radial grooves or channels *u*, Figs. 2, 3, and 5, leading from the annular recess *a* to the upper part of the space *o*, constituting passages for the escape of air from said recess should any be trapped therein at any time when the cover is placed upon the jar.

When opening the jar to remove the contents, the stopper *e* is first withdrawn to admit air into any vacuum beneath the cover that may have resulted from the cooling and shrinking of the fruit after canning. After air is thus admitted the cover may be readily removed from the jar.

In manufacturing these fruit-jars I prefer usually to slightly enlarge the bodies of the jars at the parts where the spiral ribs *l* are located, giving the jar at that part a zone E of slightly increased diameter, as shown in Figs. 1 and 6, for the purpose of increasing its strength. I also prefer to lengthen the spiral ribs *l* and cause them to overlap at their adjacent ends, as clearly shown in Fig. 6, which also tends to strengthen the parts of the jar where the pull of the holder C for the cover is exerted.

In the modified form of some of the parts shown in Figs. 7 and 8 the body A′ is made uniformly cylindrical downward from a line above the spiral ribs *l*′ and the head D′ of the cover B′ is formed without spiraled parts, the stopper *e*′ being held to place by a bail-like element *f*′, carried by lugs *t*, projecting upward from the body of the holder C′ for the cover. The manner of holding the stopper for closing the opening in the cover is a matter of choice; but I prefer the construction shown in Figs. 1 to 4, inclusive.

What I claim as my invention, and desire to secure by Letters Patent, is—

1. A fruit-jar having a cover formed with a part projecting at its upper side and opening out at the top, a stopper for the opening at the top of the cover, a curved binder for the stopper controlled by parts beneath the stopper, and means for securing the cover to the body of the jar.

2. A fruit-jar having a cover formed with a cavity opening out at the top, and means for closing the opening, the cover having a seat for a packing-ring, and downward projections within the seat, and formed with channels communicating between said seat and the upper part of the interior of the cover, and means for securing the cover in place upon the jar.

3. A fruit-jar having a body portion and a cover therefor, the body portion having spiral ribs, and a holder for the cover having parts engaging with said spiral ribs, the ends of the spiral ribs overlapping at the sides of the body of the jar, with spaces between the overlapping portions of the ribs.

4. A fruit-jar having a body portion and a cover therefor the former having a zone of enlarged diameter near the cover, a series of spiral ribs projecting laterally from said enlarged zone, and a holder for the cover having extended parts engaging with said ribs.

In witness whereof I have hereunto set my hand, this 27th day of May, 1904, in the presence of two subscribing witnesses.

WILLIAM RICHARDS.

Witnesses:
    ENOS B. WHITMORE,
    MINNIE SMITH.